United States Patent [19]

Parry

[11] Patent Number: 5,244,054

[45] Date of Patent: Sep. 14, 1993

[54] VEHICLE, CONTINUOUSLY VARIABLE GEAR MECHANISM, AND TRANSPORT SYSTEM

[75] Inventor: John P. M. Parry, Halesowen, United Kingdom

[73] Assignee: J. P. M. Parry & Associates Limited, Warley, United Kingdom

[21] Appl. No.: 768,976

[22] PCT Filed: Apr. 3, 1990

[86] PCT No.: PCT/GB90/00492

§ 371 Date: Oct. 4, 1991

§ 102(e) Date: Oct. 4, 1991

[87] PCT Pub. No.: WO90/11906

PCT Pub. Date: Oct. 18, 1990

[30] Foreign Application Priority Data

Apr. 4, 1989 [GB] United Kingdom ............... 8907553
Apr. 29, 1989 [GB] United Kingdom ............... 8909960
Oct. 13, 1989 [GB] United Kingdom ............... 8923150

[51] Int. Cl.[5] .................................................. B60K 1/04
[52] U.S. Cl. .................................... 180/165; 180/65.3; 476/38
[58] Field of Search ................. 180/165, 65.3; 74/198

[56] References Cited

U.S. PATENT DOCUMENTS

| 3,698,255 | 10/1972 | Schott | 74/193 |
| 4,218,889 | 8/1980 | Buell | 180/165 |
| 4,471,668 | 9/1984 | Elsner | 74/687 |
| 4,625,823 | 12/1986 | Frank | 180/165 |

FOREIGN PATENT DOCUMENTS

| 0043909 | 1/1982 | European Pat. Off. . | |
| 0131505 | 1/1985 | European Pat. Off. . | |
| 2161266 | 6/1973 | Fed. Rep. of Germany | 180/65.3 |
| 2332514 | 1/1975 | Fed. Rep. of Germany . | |
| 2219879 | 10/1983 | Fed. Rep. of Germany . | |
| 1068522 | 6/1954 | France . | |
| 1127215 | 3/1955 | France . | |
| 9011906 | 10/1990 | PCT Int'l Appl. | 180/165 |
| 458678 | 7/1936 | United Kingdom . | |
| 993341 | 5/1965 | United Kingdom . | |
| 1255027 | 11/1971 | United Kingdom . | |
| 1429542 | 3/1976 | United Kingdom . | |
| 2031822 | 4/1980 | United Kingdom . | |
| 2136369 | 9/1984 | United Kingdom . | |

OTHER PUBLICATIONS

"Electric Vehicle CVTs Evaluated", Automotive Engineering, Sep. 1981.
"Flywheel Propulsion System Lets Trolley Coaches Run Off-Wire" Machine Design, vol. 46, No. 12, May 16, 1974, U.S.
"Flywheel Buses Advance in Europe" by David Scott et al. Automotive Engineering, Dec. 1980, Dallas, Tex., USA.

Primary Examiner—Eric D. Culbreth
Attorney, Agent, or Firm—R. Neil Sudol; Henry D. Coleman

[57] ABSTRACT

A vehicle has as its prime source of power a fly-wheel (6) that is connected to a driving wheel of the vehicle through a continuously variable transmission mechanism (16). The transmission mechanism comprises conical drive members (53, 54, 82), with a spherical transmission element (55,) 81 between the conical surfaces, to transmit rotary forces from one drive member to the other. In this way rotation energy from the fly-wheel may be transmitted to the drive wheel on acceleration of the vehicle, or transmitted from the drive wheel to the fly-wheel of retardation of the vehicle. The vehicle is for use in a transportation system in which the vehicle travels around a predetermined route, with the flywheel being recharged either mechanically or electrically at a vehicle terminus (L).

9 Claims, 6 Drawing Sheets

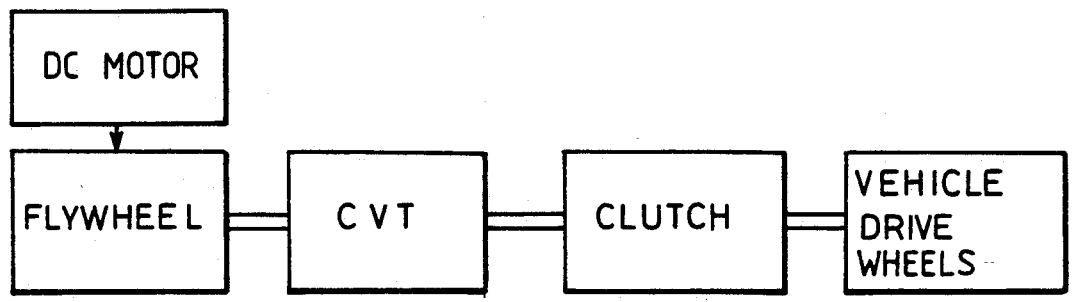
FIG 2a
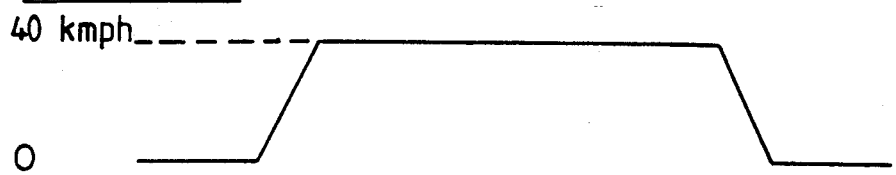
FIG 2b – Vehicle Speed.
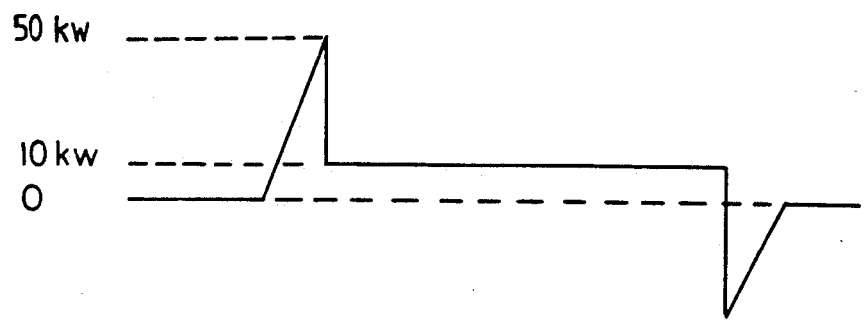
FIG 2c – Power Transfer
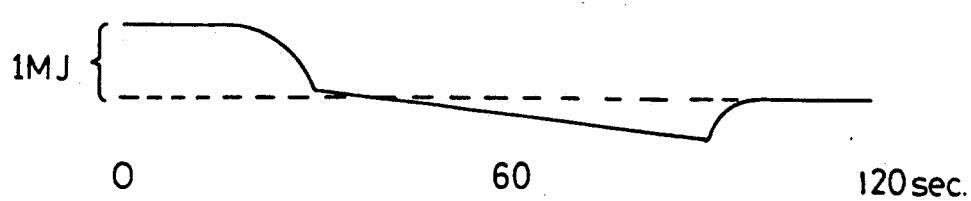
FIG 2d – Flywheel Energy

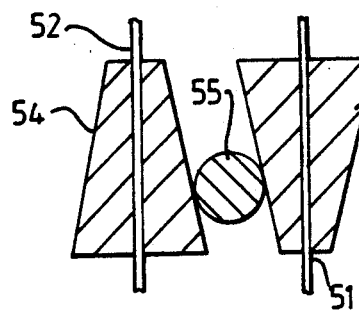
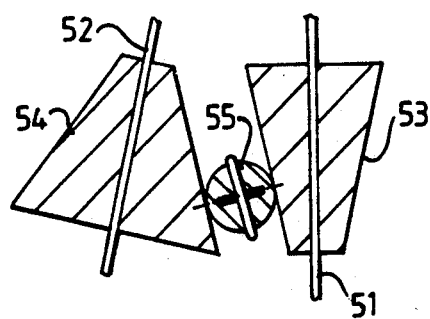
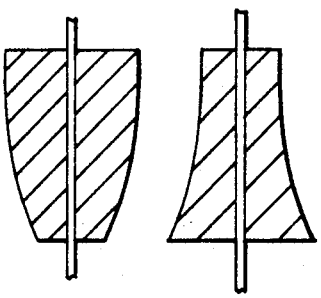
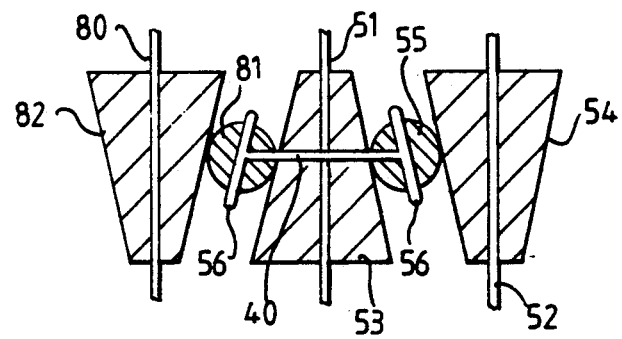
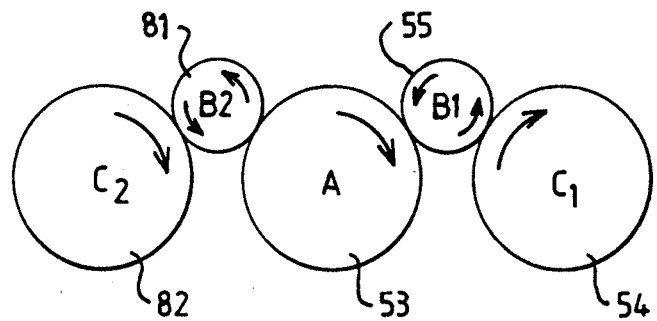

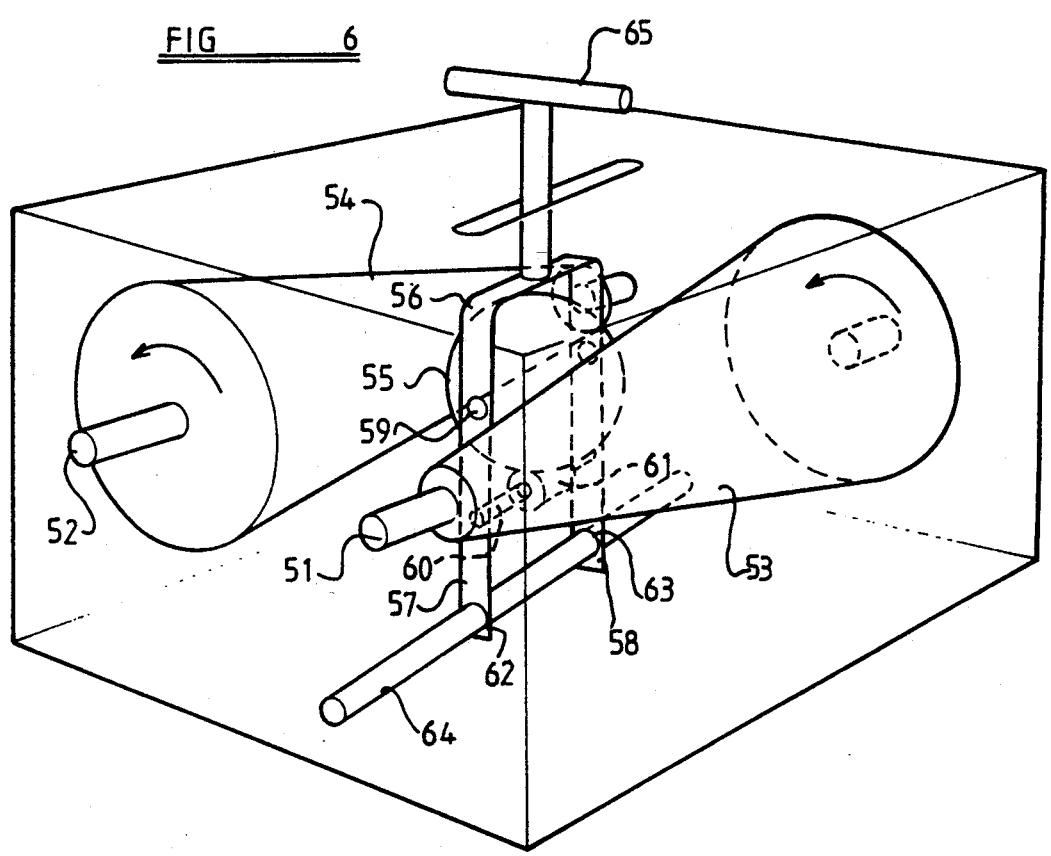

VEHICLE, CONTINUOUSLY VARIABLE GEAR MECHANISM, AND TRANSPORT SYSTEM

DESCRIPTION OF INVENTION

A first aspect of this invention is concerned with improvements relating to vehicles, and in particular to transport vehicles. The invention has been devised primarily for vehicles used in urban transport systems: however it is to be appreciated that the invention may be utilised to other forms of transport vehicle.

Difficulties have been encountered over the years in providing urban transport systems, both in relation to the cost of the vehicles themselves, and in the provision of environmentally satisfactory motive power.

For example considerable advantages are to be gained by the use of electrical-powered vehicles: however laying power lines over the routes to be taken by the vehicles is extremely expensive.

According to this invention there is provided a transport system comprising:
(a) a plurality of vehicles each comprising a fly-wheel and mechanical transmission means by which power may be transmitted from the fly-wheel to one or more driving wheels of the vehicle, and
b) means provided at one or more locations to provide energy to the fly-wheel.

For example, the system may comprise means to provide energy to the fly-wheel at intervals along the route, or at a central location such as a terminus to which the vehicle periodically returns.

In this manner the vehicles may be devoid of any motive power source other than the fly-wheel, and the fly-wheel may be utilised to accelerate the vehicle from rest to a normal running speed: advantageously the vehicle comprises braking means which is operative to return energy to the fly-wheel.

Preferably the transmission means of each vehicle comprises a continously-variable transmission (CVT), by which power may be taken from the rotating fly-wheel, for application to the driving wheels of the vehicle at an appropriate speed, the CVT being capable of being utilised to retard the vehicle and to return energy of the vehicle to the fly-wheel.

According to this invention there is also provided a transport vehicle comprising a vehicle body, a plurality of wheels on the body including at least one driving wheel, a source of motive power on the vehicle, said source comprising fly-wheel means, and a continuously variable transmission mechanism operable between the fly-wheel means and said driving wheel.

Preferably the fly-wheel means provides substantially the whole of the motive power utilised by the vehicle, and may provide the entire source of motive power. If desired however the vehicle may comprise supplementary power means, such as in the form of an electric battery, operable to power the fly-wheel means for emergency use. Thus an electric motor may be connected to the fly-wheel means which may selectively be operable by the battery means in the event that an additional store of fly-wheel energy is required.

In this manner the fly-wheel may periodically be re-powered by the application of electrical energy to the electric motor at (for example) a way station or terminus. Alternatively or in addition the fly-wheel may be powered by mechanical means operative (for example) on the fly-wheel drive shaft at said way station or terminus.

According to this invention there is also provided a method of operating a transportation vehicle comprising a fly-wheel, in which all the energy required to accelerate the vehicle from rest is derived from the fly-wheel, and energy is transmitted from the fly-wheel to one or more driving wheels of the vehicle through the intermediary of a continuously-variable transmission mechanism.

Preferably the energy required to operate the vehicle over a plurality of cycles, each cyle commencing with the acceleration of the vehicle from rest and terminating with the deceleration of the vehicle to rest, is derived from the fly-wheel.

Preferably the continuously variable transmission means comprises twin drive members each mounted for rotation about a respective axis, said drive members each comprising a surface the radius of which increases with distance along the longitudinal axis.

Thus preferably the drive surface of each drive member is conical, conveniently in the form of a rectilinear cone (i.e. that body generated by the rotation of a straight line about an axis inclined to said straight line, but may be a curvi-linear cone, (i.e. that body generated by the rotation of a curved line about an axis).

Preferably the CVT comprises a transmission element operative between the two drive elements, conveniently a spherical member, preferably having a resilient, high-friction surface such as rubber or plastic.

Advantageously means is provided to move the transmission element backwards and forwards generally axially of the two drive members to vary the gear ratio between the two drive members.

A second aspect of this invention relates to a continuously variable drive transmission suitable for continuously varying the gearing ratio between input and output shafts of a machine or apparatus such as a motor vehicle, particularly but not exclusively a transport vehicle in accordance with the first aspect of this invention.

Continuously variable transmission arrangements are known which comprise input and output shafts each bearing a frusto-conical drive member, which may be rectilinear or curvi-linear, the drive members lying mutually adjacent and tapering in opposite directions to one another. The frusto-conical members are frictionally engaged by a transmission element afforded by a belt which is movable longitudinally of them to effect a change in the gearing ratio between the two shafts. The torque transmitted between the input and output shafts depends upon the degree of constant pressure between the driving belt and each of the frusto-conical members and the coefficient of friction of the surfaces of the frusto-conical members and the drive belt. A certain degree of slippage of the belt invariably occurs leading to loss of efficiency. This is partly because the belt has to constantly change shape as it moves relative to the frusto-conical members because of the difference in the shapes of the surfaces of the frusto-conical at each point along their length. A problem therefore arises in providing a belt of high flexibility and strength so as to meet the criterion of good frictional contact between the belt and the frusto-conical members.

The present invention provides a continuously variable drive transmission including a transmission element which overcomes or reduces some of the disadvantages described above.

According to the invention there is provides a continuously variable drive transmission comprising two drive members, each drive member providing a generally conical transmission surface, the end of narrower diameter of one transmission surface lying adjacent the end of broader diameter of the other transmission surface, and a a spherical transmission element adapted to drivingly inter-engage the two drive members.

The transmission element may be frictionally engaged between the frusto conical surfaces of the two drive members.

The surface of the transmission element may comprise a material having a high coefficient of friction and preferably the surface comprises rubber or plastics, and may for example be provided by a rubber ball.

The transmission surface of at least one of the drive members may comprise a material having a high coefficient of friction and preferably the curved surface of each comprises rubber.

Actuating means may be provided to permit moving the transmission element relative to the drive members so as to vary the gearing ratio between the two shafts. The actuating means may manually operable means, or may be automatically operable.

Actuation of the actuating means may move the transmission element in a direction longitudinally of the two shafts.

The actuating means may be operatively connected to a support which supports the transmission element such that actuation of the actuating means brings about movement of the support and hence of the transmission element longitudinally of each of the shafts, free movement of the transmission element longitudinally of said shafts being prevented by the support.

Preferably the support comprises an inverted "U" shaped frame depending arms of which provide both idlers which engage the surface of the driving element and a cross member extending between the arms which itself provides a further idler, the idlers permitting of rotation of the transmission element about any axis passing through a centre thereof.

The arms of the frame may include respective aligned apertures through which extends a guide rail for the support, the support being movable longitudinally of the guide rail.

The apertures may be elongate to permit raising and lowering of the support relative to the guide rail, to disengage the transmission element from the driving members and to re-engage the transmission element therewith is permissible.

The support may provide further member which provides an idler such that the transmission element is held captive by the support when raised so as to be disengaged from the drive members.

The two drive members may comprise a first drive member which is connected directly to a source of motive power, and a second drive member which is connected to an output system, such as the drive wheels of a vehicle. Under normal operation, the first drive member will thus provide a driving means, and the second drive member will provide a driven means.

Preferably however the construction and operation is such that the transmission means may be operated to return power from the second drive member to the first drive member, in the event that the ratio selected is one in relation to which the speed of the drive wheels is greater than the speed of the power source, as seen by the transmission mechanism.

The continuously variable drive transmission according to the invention may further include a third rotatable shaft providing a third frusto-conical drive member and a second transmission element operable between the third drive member and the drive member provided on the input shaft.

The third rotatable shaft may provide a frusto-conical drive member which tapers in the opposite direction to the drive member provided on the input shaft (i.e. that connected to the power source), and coupling means may be provided to couple the output shaft and the third rotatable shaft.

The second transmission element may comprise a sphere which is supported in a support in like manner to the aforementioned transmission element, and may be movable by a further actuating means which permits of disengagement of the second transmission element from the drive members provided on the input shaft, and the third rotatable shaft.

The second transmission element may be movable longitudinally of the input shaft and the third rotatable shaft, and may be engageable with the drive members provided by the input shaft and the third rotatable shaft when the transmission element is engaged between the drive members provided by the input and the output shafts.

Further coupling means may be provided to couple together the actuating means and the further actuating means such that operation of the actuating means causes operation of the further actuating means.

The further coupling means is preferably a mechanical coupling and operation of the actuating means to move the driving element relative to the input and output shafts brings about a corresponding movement of the second driving element relative to the input and output shafts.

There will now be given a detailed description, to be read with reference to the accompanying drawings, of a transport vehicle, a continuously variable gear mechanism, and transport system, all of which are embodiments of this invention.

In the accompanying drawings:

FIG. 2a is a schematic view of the vehicle drive train;

FIG. 2b, 2c and 2d are are graphs illustrating power transfer during the use of the vehicle;

FIG. 3 is a schematic view of part of a continuously variable transmission system of the invention;

FIGS. 4 and 5 are views of alternative forms of the transmission system;

FIG. 6 is a schematic view illustrating a means for controlling the position of drive transmission means of the system;

FIG. 7 is a schematic view of an alternative continuously variable transmission system;

FIGS. 9 and 10 are schematic views illustrating the transfer of torque between the various drive elements of FIG. 7;

Figure 1:
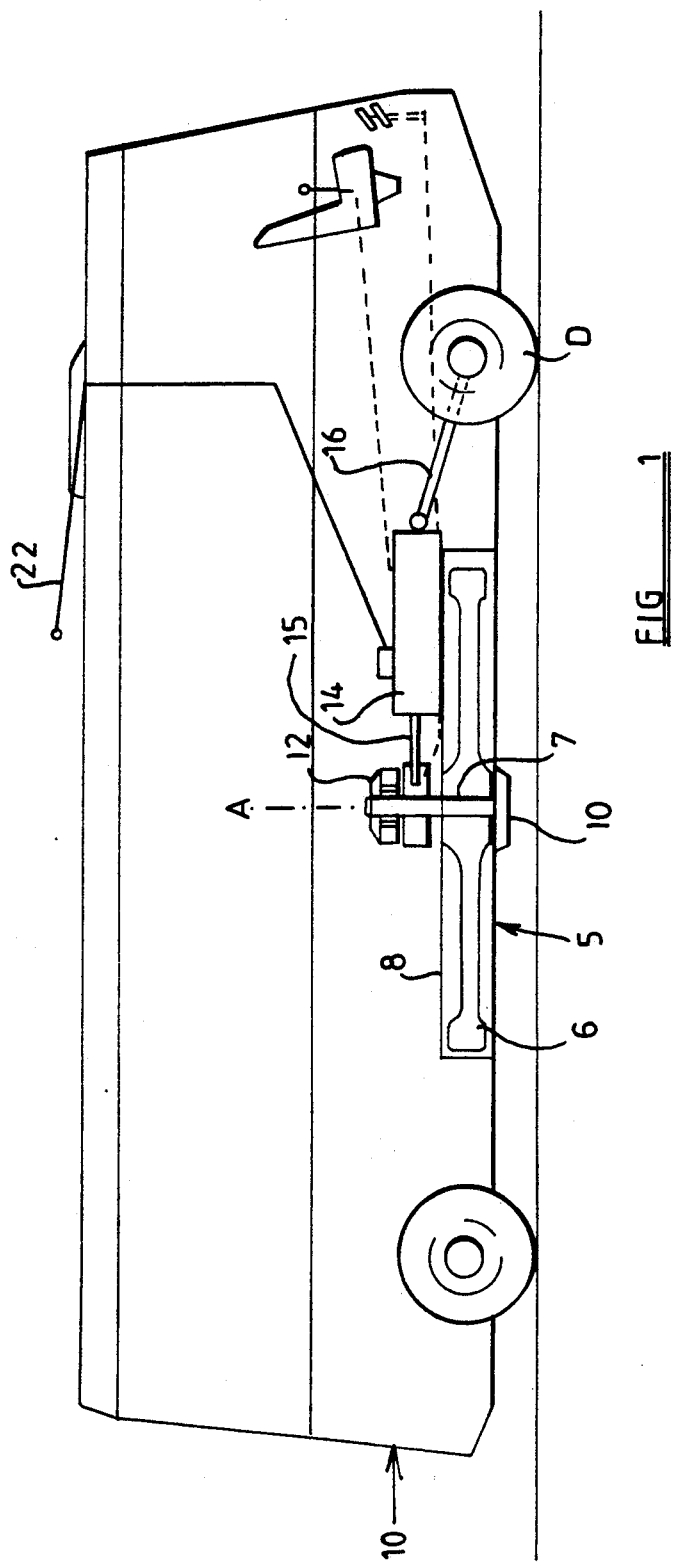
FIG. 1 is a schematic elevational view of the vehicle which is the preferred embodiment of the invention.
Figure 8:
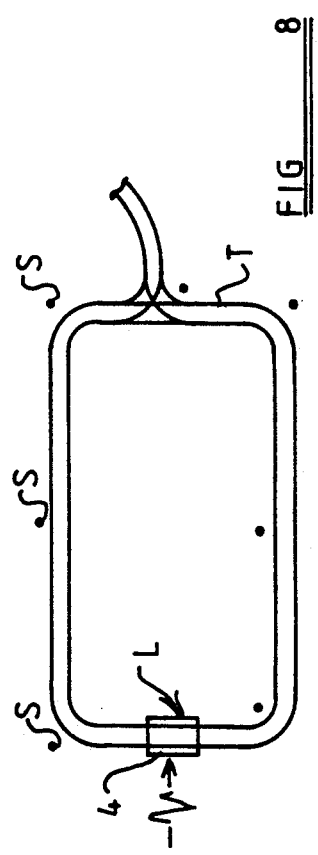
FIG. 8 is a view of a trackway system of the invention.

The vehicle which is the preferred embodiment of the invention, to be utilised in a preferred transportation system, is conveniently in the form of a tram, comprising wheels running on a trackway T. The vehicle comprises a vehicle body 4 supporting wheels, including drive wheels D. Mounted in the body 4 is a power source mechanism 5 including a fly-wheel 6 designed to provide up to 50 MJ (Mega Joules) of energy when rotating at 6000 rpm, the fly-wheel rotating in a low-pressure housing 8.

Advantageously the fly-wheel is rotatable with drive shaft 7 in bearings 10, 12 about a vertical axis A, and may be mounted on gimbels to accomodate relative tilting movement between the vehicle body and axis of rotation.

The shaft 7 is connected by a drive element 15 to a continuously-variable transmission mechanism 14, hereinafter abbreviated to "CVT", adapted in a driving mode to cause output shaft 16 to rotate, said output shaft 16 being connected, optionally through a clutch, to the driving wheels D of the vehicle.

The continuously-variable transmission mechanism is also operative, in a braking mode, to apply torque transmitted from the driving wheels D by way of the output shaft 16, to the drive shaft 7 of the fly-wheel 6.

On braking of the vehicle, e.g. reducing speed to zero, the energy of momentum of the vehicle may thus be returned to the fly-wheel.

As is shown schematically in FIG. 2a, the transmission train of the vehicle comprises fly-wheel, 6 CVT, 14 optionally a clutch, and the vehicle drive wheels. In this manner, energy is imparted progressively from the fly-wheel to the vehicle drive wheels on acceleration of the vehicle and maintenance by the vehicle of a constant speed, and is returned to the fly-wheel from the vehicle directly through the CVT, in the event of deceleration of the vehicle.

Desirably the vehicle drive train comprises a DC motor which is connected to the fly-wheel drive shaft, enabling the fly-wheel to be energised conveniently by the application of an electric power supply to a pick-up 22 of the vehicle, on return of the vehicle to a terminus, or at one or more way stations provided along the vehicle route.

In addition if desired, the vehicle may carry one or more batteries for an emergency application of power to the fly-wheel, in the event that this becomes run down whilst the vehicle is some distance from a convenient supply to electricity.

Alternatively of course, the fly-wheel may be re-powered at the vehicle terminus by mechanical means applied directly to the drive shaft 7, if desired.

FIG. 2b illustates acceleration of the vehicle from a stop condition to a speed of 40 kph, and returning to a stop condition, whilst FIG. 2c illustrates the transfer of energy from the fly-wheel to the vehicle, and return to the fly-wheel on the vehicle being brought to a halt. From this it will be seen that approximately 10 kW are utilised in maintaining the vehicle at its cruising speed.

As will be seen from FIG. 2d, initially 1 megajoule of fly-wheel energy is utilised in accelerating the vehicle from rest, and thereafter approximately 1 MJ is utilised in maintaining the vehicle at it cruising speed. On deceleration to rest, approximately 1 MJ is returned to the fly-wheel.

It has been found that the vehicle, when fully charged, will be able to cover a route of up to 30 km with up to 30 stops before a further charge is required. This is normally sufficient in urban areas to permit the vehicle to return to a terminus L for recharging (FIG. 2c), although if necessary recharging stations may be provided on the route.

The continously variable drive transmission comprises an input shaft 51 and an output shaft 52 providing respective axially extending, mutually adjacent frusto-conical drive members 53, 54. The drive members 53, 54 are fixed rigidly to their respective shafts and are positioned relative to one another so that the narrow end of the drive member 53 on the input shaft 51 lies adjacent the broad end of the drive member 54 on the output shaft 52. Whilst the input shaft 51 and output shaft 52 shown in the drive transmission arrangement of FIG. 3 lie parallel to one another, in an alternative arrangement, such as is shown in FIG. 4 the input and output shafts run at an angle to one another. Moreover, whilst in the arrangement shown in FIG. 3 the transmission members are each of the same angle of taper, in an alternative arrangement, such as is shown in FIG. 4, the drive members may each have a different angle of taper. Still further, whilst the drive members 53, 54 shown in the arrangement in FIG. 3 each have the same diameters at their respective narrow and broad ends, in an alternative arrangement, the broad and the narrow ends of one of the drive members may be broader than the respective ends of the other drive member whilst both drive members still retain the same angle of taper.

Further, whilst the arrangement shown in FIGS. 3 and 4 are those of drive members in the form of rectilinear frusto-cones, it will be appreciated that curvi-linear frusto-cones may be utilised, as is shown in FIG. 5, which may be desirable in the event that a non-linear gear ratio is desired.

In FIG. 3 a sphere 55 is shown disposed between the drive members 53 and 54 and the sphere 55 constitutes a transmission element which drivingly inter-engages the two drive members 53, 54 so as to transmit drive from the input shaft 51 to the output shaft 52.

As the output shaft 51 turns, the conical member 53 also turns and by frictional engagement of the conical member 53 with the sphere 55, the sphere 55 is made to rotate in an opposite direction to the direction of rotation of the input shaft 51. By frictional engagement of the sphere 55 with the curved surface of the drive member 54 on the output shaft 52 the drive member 54 and the output shaft 52 are caused to rotate in the same direction as the input shaft 51.

For the purposes of efficient transmission between the input shaft 1 and output shaft 52 the sphere is made of rubber or some other such material which has a high coefficient of friction. Alternatively or additionally the curved surface of the drive members 53, 54 comprises rubber also or some other suitable material having a high coefficient of friction.

As the input shaft 51 is turned the sphere 55 is drawn into the nip between the drive members 53, 54 but its diameter is too large to permit it to be drawn completely through the nip between the drive members.

Desirably the sphere 55 is supported by a support 56 (see FIG. 6) which limits movement of the sphere 55 in a direction parallel to the adjacent curved surfaces of the drive members 53, 54. The support 56 comprises an inverted "U" shaped frame depending arms 57, 58 of which provide aligned idlers 59 such as ball bearings which may be captive in the depending arms 57, 58 of the frame but which can rotate in all directions. The depending arms 57, 58 also provide a cross bar 60 which extends between them, the cross bar 60 also providing an idler 61.

Because the sphere 55 is supported in the frame of the support 56 in this way it is free to rotate about any axis passing through its centre. Because this is so, when it is desired to move the sphere relative to the longitudinal axes of the input and output shaft 51, 52 such movement is made easy.

The depending arms 57, 58 also provide aligned apertures 62, 63 through which passes a guide rail 64 which serves to guide the support and to permit of movement of the support longitudinally of the guide rail. The support 66 provides a handle 65 which may be operated by a user of the drive transmission to move the ball relative to the input and output shafts 51, 52 so as to effect a change in the gearing ratio, the output being lowest from when the ball is positioned adjacent the broad end of the drive member 54 on the output shaft 52 and adjacent the narrow end of drive member 53 on the input shaft 51.

It can be seen from FIG. 6 that by actuation of the handle 65, gear changes can be effected. Disengagement of the sphere 55 could be achieved using the support 56 and guide rail 64 shown in FIG. 6, provided that the guide rail itself may be moved perpendicularly to the longitudinal direction of the guide rail.

It will be understood that the sphere 55 may be supported in the frame of the support 6 by alternative means to that shown in FIG. 6.

By making the apertures 62, 63 elongate to permit lifting of the handle 65, a suitable clutch mechanism is obtained for disengaging the drive sphere 55 from the transmission.

Preferably however the drive transmission mechanism comprises a third rotatable shaft 80 (shown schematically in FIG. 7) and drive from output shaft 52 is transmitted via a suitable coupling to the third rotatable shaft 80 which is provided with a frusto-conical drive member 82 which tapers in the opposite direction to the drive member on the input shaft 51. The output from the third rotatable shaft 80 may then be used, for example, to drive the input shaft 51 thus effecting some conservation of energy by engaging a further transmission element 81 between the drive members 53 and 82. The transmission element 81 is spherical and is similar to the transmission element 55.

Figure 10:
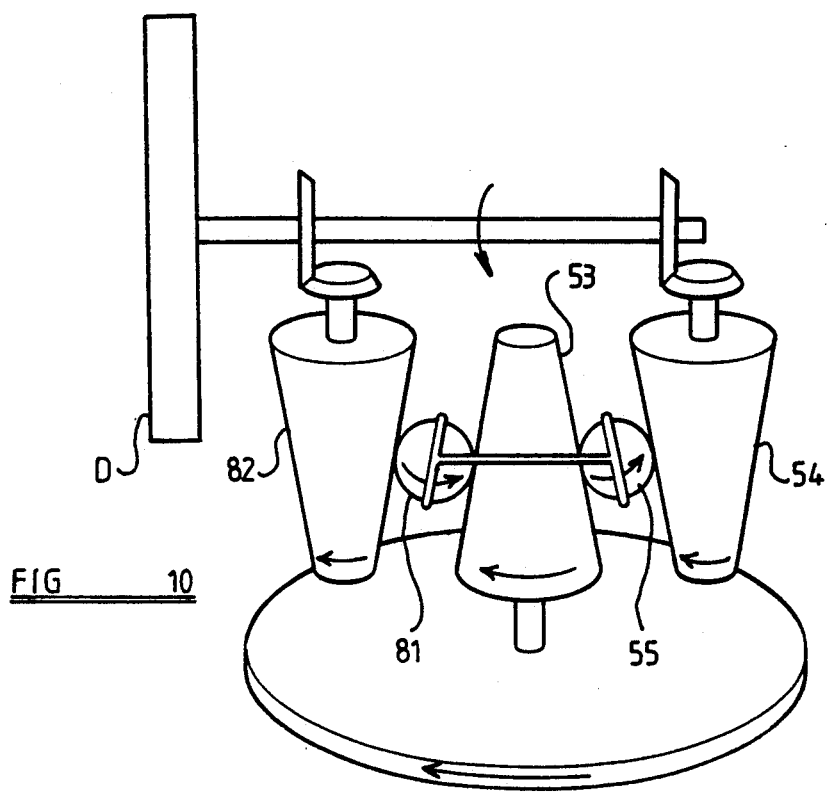

The operation of the CVT, will now be described with reference to FIGS. 9 and 10. As has been mentioned, the drive member 53 is connected to the drive shaft 7 of the fly-wheel means, whilst the drive members 54 and 82 are connected via an output shaft to the vehicle driving wheels D.

When the vehicle is cruising at a steady state, there will be frictional retardation of the vehicle, and the drive members 54 and 82 will lag, rotationally speaking, somewhat behind the drive member 53. Thus the surface velocity A/B will be slightly greater than the surface velocity C1/B1 resulting in the transmission element 55 being drawn into the nip between the drive members 53 and 54, in consequence providing a positive transmission of energy from the fly-wheel to the vehicle driving wheels. Conversely, the surface velocity A/B2 will be greater than the surface velocity B2/C2 resulting in a tendency for the spherical transmission element 81 to be lifted from the nip between the drive members 53 and 82. Thus in general, where the position of the control means of the CVT results in a gear ratio in which the drive member connected to the fly-wheel is rotating at a greater rate than the drive member connected to the driving wheels, torque will be transmitted to the transmission member 54 by the transmission element 55.

Conversely, in the event that the drive member 53 is rotating at a speed lower than the drive member 54, 82 (as far as the transmission elements 55 and 81 are concerned), the transmission element 81 will be drawn into the nip between the drive members 82 and 53, whilst the transmission element 55 will be lifted from the nip between the drive members 53 and 54.

Thus simply by adjusting the position of the control mechanism in the direction longitudinally of the drive members, the CVT may be moved between a condition in which power is applied from the fly-wheel to the driving wheels of the vehicle, or applied from the driving wheels to the fly-wheel. In both cases, the distance of the transmission elements from a medium centreline (corresponding to equal velocity positions) will determine the rate at which power is so applied, and hence the rate of acceleration or deceleration of the vehicle.

Figure 11:
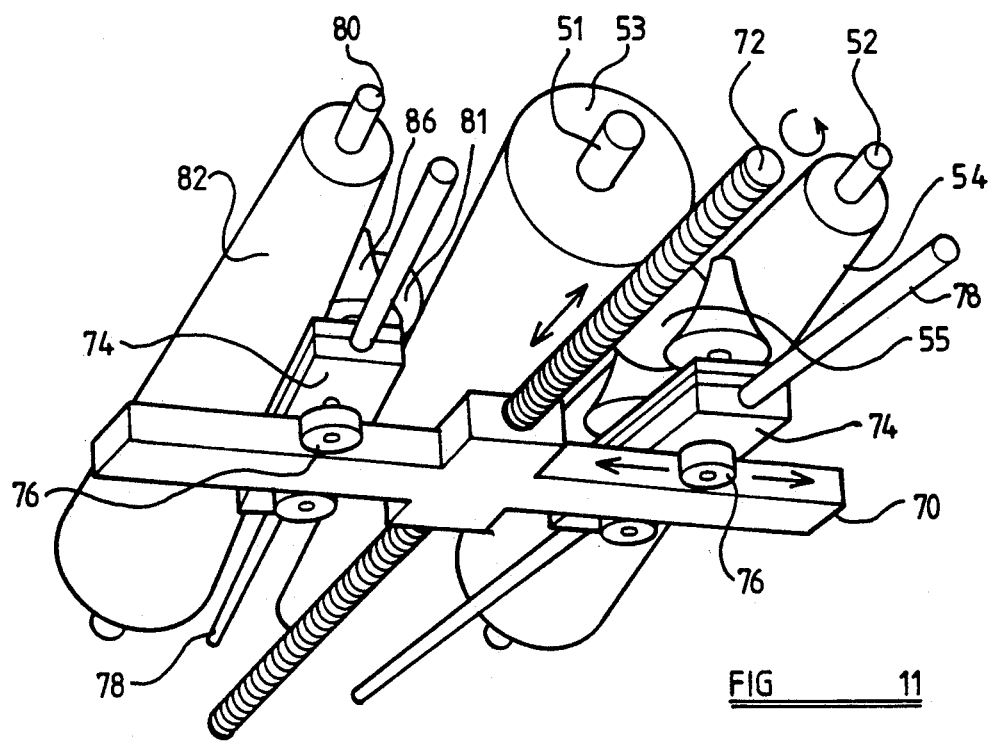
FIG. 11 is an underneath plan view of an actuating mechanism of the preferred embodiment.
Figure 12:
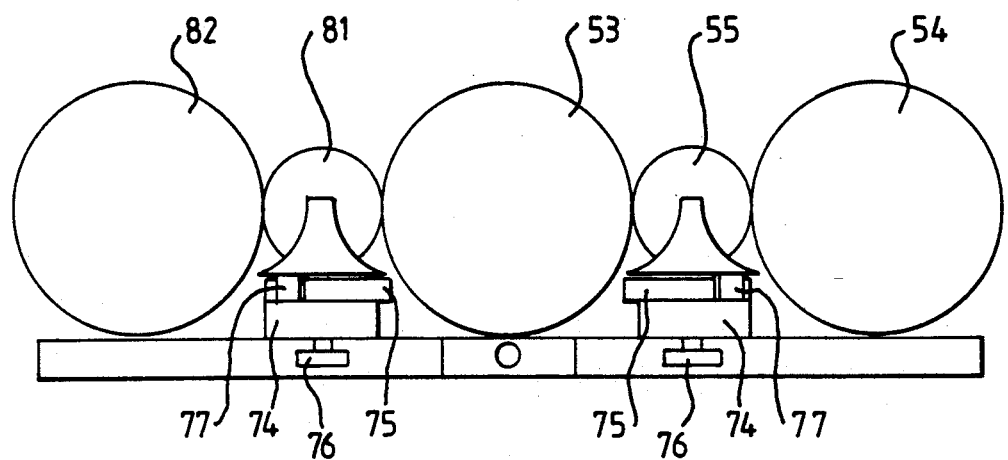
FIG. 12 is an end elevation of the actuating mechanism.
Figure 13:
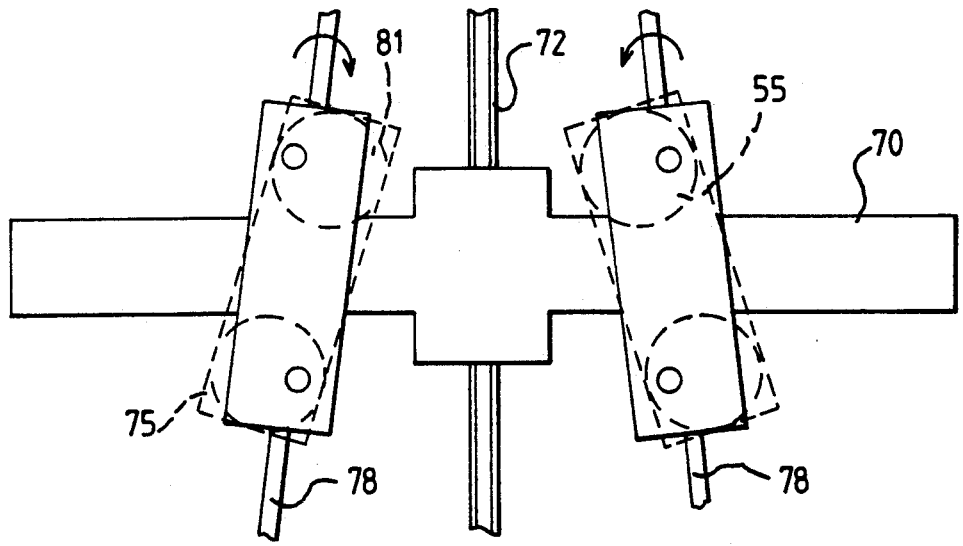
FIG. 13 is a plan view of the actuating mechanism.

The continuously variable transmission mechanism which is the preferred embodiment of this invention comprises the actuating mechanism shown in FIGS. 11 to 13, by which gear change may be effected smoothly, reversibly, and automatically. The actuating mechanism comprises a cross-head 70 mounted on a worm 72 extending beneath, and generally parallel to, the axis of the drive member 53. By rotation of the worm 72, the cross-head 70 may be driven lengthwise of the drive member 53 in either direction.

Mounted on the cross-head, for movement in the widthwise direction, are twin carriages 74, being guided for widthwise movement by wheels 76. Mounted on each carriage 74 is a pivoted bracket 75 which carries, spaced in the longitudinal direction, twin guide cones 86 the guide cones being rotatable on the bracket 75 by an eccentric pivot axis 77.

The two transmission elements (rubber balls 55 and 81) are mounted each between a pair of guide cones 86, and as the balls rotate in the transmission of torque from one drive member to the other, they rotate the guide cones about their eccentric axes 77, causing a backwards and forwards rocking movement of the bracket 75. Such reciprocating movement produces unbalanced forces against the transmitting element, preventing the transmitting element from adopting a "set" which may result in undue wear being produced along a circumferential line of the ball.

It will be appreciated that by rotation of the worm 72 the cross-head 70 may be moved longitudinally (i.e. in the axial direction) of the transmission mechanism, to vary the gear ratio between the input and output shafts, widthwise movement of the balls 55 and 81 being accommodated by movement of the carriages 74 on the cross-head 70.

If desired the carriages 74 may be guided on tie rods 78, said tie rods being spaced equidistantly from each adjacent pair of axes, i.e. dividing the space between the two adjacent conical surfaces.

As has been stated, on movement of the actuating mechanism longitudinally of the transmission mechanism, first one torque transmitting ball, and then the other, will be called into play, the ball which is not transmitting torque being lifted slightly from between the nip of the two adjacent cones, being retained against falling out of position by the guide cones 86.

Although the elements 55 and 81 have been described as being rubber balls, alternatively the surface of such a transmission element may comprise plastics.

Of course if desired a cage system somewhat similar to that illustrated in FIG. 6 may be utilised, physically to prevent the torque transmitting balls from becoming detached from their operative positions.

I claim:

1. In combination, a source of motive power and a continuously variable drive transmission, the source of motive power comprising fly-wheel means, and the continuously variable drive transmission comprising first and second drive members, each drive member providing a generally conical transmission surface, the end of narrower diameter of one transmission surface lying adjacent the end of broader diameter of the other transmission surface, further comprising a spherical transmission element having a resilient high friction surface and being adapted to drivingly interengage the two drive members, the combination further comprising a third drive member providing a third generally conical transmission surface, and a second spherical transmission element, having a resilient high friction surface, positioned to drivingly interengage the third drive member and the first drive member, and the third drive member being drivingly connected to the output of the transmission, whereby energy may be returned from the output of the transmission to the fly-wheel means under some circumstances.

2. The combination as claimed in claim 1 wherein said resilient high friction surface is rubber.

3. The combination as claimed in claim 1 further comprising actuating means, for supporting the transmission element and for moving the transmission element longitudinally relative to the drive members so as to vary the ratio of the transmission, said acuating means being adapted to produce unbalanced forces against the transmission element.

4. The combination as claimed in claim 1 comprising actuating means to move both of the transmission elements simultaneously.

5. The combination as claimed in claim 1 wherein said resilient high friction surface is plastic.

6. A transport vehicle comprising:
 (a) a vehicle body;
 (b) a plurality of wheels in the body including at least one driving wheel; and
 (c) in combination, a source of motive power and a continously variable drive transmission, the source of motive power comprising fly-wheel means, and the continuously variable drive transmission comprising first and second drive members, each drive member providing a generally conical transmission surface, the end of narrower diameter of one transmission surface lying adjacent the end of broader diameter of the other transmission surface, the fly-wheel means being connected to the first drive member and the second drive member being connected to an output of the transmission, and the transmission further comprising a spherical transmission element having a resilient high friction surface and being adapted to drivingly interengage the two drive members, the combination further comprising a third drive member providing a third generally conical transmission surface, and a second spherical transmission element, having a resilient high friction surface, positioned to drivingly interengage the third drive member and the first drive member and the third drive member being drivingly connected to the output of the transmission, whereby energy may be returned from the output of the transmission to the fly-wheel means under some circumstances, wherein the fly-wheel means and the continuosly variable drive transmission are provided on the vehicle and the transmission is operative between the fly-wheel means and said driving wheel.

7. A transport system comprising a plurality of vehicles, each vehicle comprising:
 (a) a vehicle body,
 (b) a plurality of wheels on the body including at least one driving wheel; and
 (c) in combination, a source of motive power and a continuously variable drive transmission, the source of motive power comprising fly-wheel means, and the continuously variable drive transmission comprising first and second drive members, each drive member providing a generally conical transmission surface, the end of narrower diameter of one transmission surface lying adjacent the end of broader diameter of the other transmission surface, the fly-wheel means being connected to the first drive member, and the second drive member being connected to an output of the transmission, and the transmission further comprising a spherical transmission element having a resilient high friction surface and being adapted to drivingly inter-engage the two drive members, the combination further comprising a third drive member providing a third generally conical transmission surface, and a second spherical transmission element, having a resilient high friction surface, positioned to drivingly interengage the third drive and the first drive member, and the third drive member being drivingly connected to the output of the transmission, whereby energy may be returned from the output of the transmission to the fly-wheel means under some circumstances, wherein the fly-wheel means and the continuously variable drive transmission are provided on the vehicle and the transmission is operative between the fly-wheel means and said driving wheel,
 and means being provided at one or more locations to provide energy to the fly-wheel means of the vehicles.

8. A transport system as claimed in claim 7 wherein said means to provide energy is provided at intervals along a route.

9. A transport system as claimed in claim 7 wherein said means to provide energy is provided at a central location to which the vehicles periodically return.

* * * * *